Dec. 30, 1941.     H. RUSKA ET AL     2,267,752
ARRANGEMENT FOR PRODUCING FILTERS AND ULTRA FILTERS
Filed Jan. 23, 1939
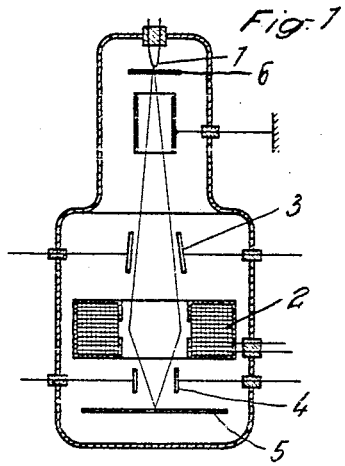
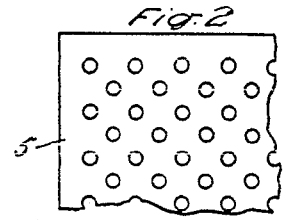
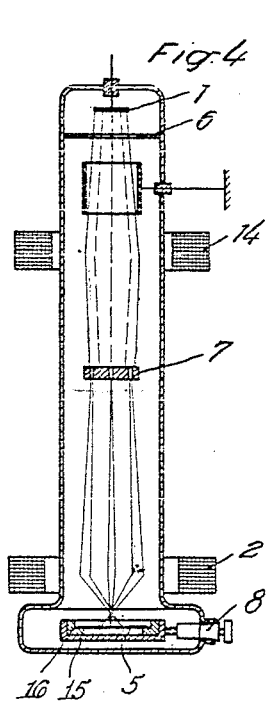
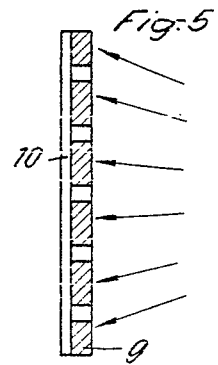
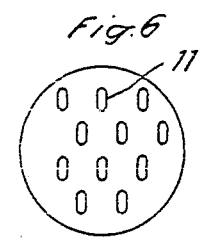
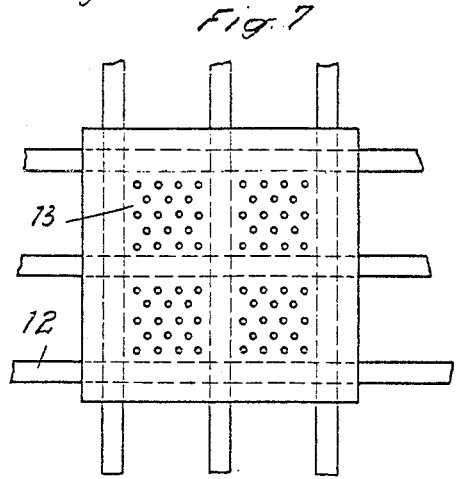
Inventors
Helmut Ruska and
Bodo v. Borries
by Knight Bros.
attorneys Patented Dec. 30, 1941

2,267,752

UNITED STATES PATENT OFFICE 2,267,752

ARRANGEMENT FOR PRODUCING FILTERS AND ULTRA FILTERS

Heimut Ruska, Nikolassee, near Berlin, and Bodo v. Borries, Berlin-Spandau, Germany, assignors to "Fides Gesellschaft für die Verwaltung und Verwertung von gewerblichen Schutzrechten mit beschrankter Haftung," Berlin, Germany, a corporation of Germany Application January 23, 1939, Serial No. 252,352
In Germany January 25, 1938

6 Claims. (Cl. 250—27.5)

The filters known prior to the present invention, as also the ultra filters of the colloid chemistry, generally are depth filters in which relatively thick filter masses are used which are provided with channel-like pores extending not only at right angles to the filter surface and not at all in a straight line. Furthermore, these pores do not have a constant cross-section and the average cross-section of the individual pores of these known filters always differs considerably. The filter properties are not merely a result of the size of the pores but also of the physical-chemical condition of the walls of the channel-like pores since adsorption acts an important part on these walls.

The disadvantages described above are avoided by the present invention, according to which filters and ultra-filters may be formed which, relative to the size of the pores, are thin and particularly uniformly thin, and in which the pores are of definite size. The filters according to the invention therefore comply with all requirements of a real surface filter. In working with these filters the advantage is primarily obtained that the filter properties are dependent only upon the size of the pores and their shape and are not anymore affected by the properties of the pore walls. Since the size of all pores is perfectly uniform, the filters according to the present invention produce a filtrate of greater uniformity.

According to the invention, in a method of producing filters and ultra-filters, that is, real surface filters with the qualities of an ideal sieve, holes of constant predetermined size and shape and the desired distance from one another are burned into a thin foil by means of one or several fine cathode rays.

The invention is illustrated in the accompanying drawing, in which—

Fig. 1 represents a longitudinal section through a cathode ray tube arranged for the purpose of the present invention and illustrating its principle of operation.

Fig. 2 represents a fragment of the finished filter, greatly enlarged.

Fig. 3 represents in transverse section a support for the foil to be perforated.

Fig. 4 represents a longitudinal section through a cathode ray tube showing a modified arrangement of Fig. 1.

Fig. 5 represents a transverse section through a stencil produced according to the present invention for reproducing perforations in a foil.

Fig. 6 represents, greatly enlarged, a filter foil having oblong holes, and

Fig. 7 represents a sieve with coarse openings or meshes serving as a support of a foil provided with a plurality of perforated fields.

The production of the filters usually proceeds in such a manner that first according to one of the known processes a colloid foil or a thin metal foil or the like of approximately 1 to 100 m$\mu$ thickness (1 m$\mu$=10$^{-3}\mu$=10$^{-6}$ mm.) is formed, whereupon this foil is scanned in a vacuum with a finely concentrated cathode ray, as shown in Fig. 1. The electron spot forming the image of the cathode which is electron-optically reduced, then has a diameter approximately equal to the desired size of the pores, and this spot may be obtained by a reduction in one or several stages of the size of an electron beam produced by an intense electron source. Scanning is performed by deflecting the beam by electric or magnetic fields in front of or behind the reduction lens 2, as shown in Fig. 1 in which numerals 3 and 4 indicate the position where the deflecting fields are located. In scanning the foil 5, the electron beam is modulated by means of a Wehnelt electrode 6, similarly as in a televison receiving apparatus. However, a modulation is necessary only between the very bright and very dark limits. During the movement of the beam, it is increased to full strength at those places where a pore is to be formed in the foil. Thereby a hole is burned into the foil corresponding in size substantially to the electron spot. During the movement to the next pore the beam is darkened by appropriate switching operations in well-known manner, for instance by controlling the potential applied to the Wehnelt electrode 6 so that the beam current becomes zero.

The time of keeping the beam focused upon the foil for burning-in each individual pore and the beam current must be adapted to the material and thickness of the foil. In cases in which the production of the filter would require a long time, it may be advisable to move the beam along a scanning line not at a constant speed but to shift the same after burning-in of a pore abruptly to the place of the next pore.

Suitable switching operations make it easily possible to offset the place of the pores of one line relative to the place of the pores of the previous line one half the distance between two pores, so that a pattern shown in Fig. 2 is produced.

The foils 5 which are to be perforated are preferably mounted on a perforated foil carrier or supporting diaphragm 16 (Fig. 3) which is held in turn in a suitably shaped chuck 15 of the perforating apparatus and, also fits into a correspondingly shaped chuck of the filtering apparatus. Tests have shown that unperforated collodion foils of a thickness of 50 mµ on a diaphragm support of 0.1 mm. diameter are capable of withstanding a pressure difference of one atmosphere and remain vacuum-tight. They are therefore extremely resistant. If my means of filters and ultra-filters made according to the new method any kind of colloidal solutions or other fluids containing smallest particles are to be filtered, the filter may be subjected to a considerable difference in pressure. However, the known electrolytic filtering processes may also be used, and the material to be filtered may be moved or shaken during the filtering process.

In order to shorten the process of producing such filters it may be advisable to use not merely a single electron spot for burning-in the holes but a plurality of such spots all of which have the prescribed diameter and distance from one another. Such a bundle may be formed so that either in place of a pointlike electron source such as is produced according to Fig. 1, a diaphragm 7 (Fig. 4) which is many times perforated is inserted into the electron beam path and copied by bombardment with electrons from the electron source 1 through a lens 14, or that a net containing a plurality of perforations is copied by the reducing lens 2, or that such a perforated diaphragm or a corresponding net is provided at the place of the intermediate image of the first reduction step or of one of the intermediate images. Thus, with each burning operation a number of pores are burned into the foil simultaneously, equal to the number of perforations in the diaphragm. The arrangement for shifting the coil relatively to the beam is made in this case so that the next succeeding group of pores to be burned becomes located adjacent to the group which has already been burned. This relative motion may be produced either by shifting the direction of the beam with respect to the fixed foil, such as is shown at 3, 4 in Figure 1, or else the foil may be shifted mechanically relatively to the fixed beam. Figure 4 shows a modification in which the screw arrangement 8 serves for shifting the foil holder 16 resting in the chuck 15, together with the foil with respect to the fixed electron beam.

By means of an especially intense cathode ray it may also be possible to burn holes into foils which are considerably stronger than the foils which are to be used later in the filter. By such a perforated resistant foil a filter stencil may thus be formed and transferred or copied by suitable means upon the real filter foils (see Fig. 5). In such a case either the stencil filter 9 or the filter foil 10 may be placed into a vacuum and there bombarded with electrons from the side of the stencil. However, the filter foil 10 may, for example, also be placed on top of the stencil foil 9 and holes may be pressed into the same from the side of the filter foil 10 by means of compressed air. Finally, according to the principle of the sand blast, very small and sharp particles may be thrown by a compressed air current from the side of the stencil foil 9 against the filter foil 10 so as to perforate the latter according to the stencil.

The filters described above are especially suitable for micro-filters because they make it possible to filter substance quantities of a few cubic millimeters without loss, while with the micro-filters known prior to the invention losses of several cubic millimeters could not be avoided.

By electron-optical means it is also possible according to the invention to give the electron spot a shape deviating from that of a circle (Fig. 6). This may for example be obtained by suitably forming and copying an intermediate image diaphragm templet such as 7 in Fig. 4, provided with oblong holes. An elongated hole 11 may also be obtained by relative movement between the spot and the foil 5 in Fig. 4, for instance by the device 8, while the bright spot is applied. In such a manner filters and ultra-filters may be obtained with holes of any desired shape, for example, an elongated oval shape, an elongated shape with semicircular ends, rectangular or any other shapes. It is thus possible to separate from one another with a better yield bodies of the same longitudinal but different transverse dimensions.

For filters of larger yield the foils are placed, for example, on a coarse supporting sieve 12, Fig. 7, and on each mesh of this sieve a perforated field 13 is formed by means of the cathode ray. After forming a perforated field in one mesh the foil is preferably shifted together with the supporting net relative to the electron ray by mechanical means 8 to expose the next adjacent mesh of the sieve to the ray and thus produce a perforated field for this mesh, and so forth until all meshes are exposed.

If N is the number of holes of a field 13, D the distance between the centres of the holes and $d$ the diameter of a hole, the following limits for dimensions of the filters and ultra-filters will be found:

$$200{,}000 > N > 20$$
$$15d > D > 2d$$
$$300\ m\mu > d > 3\ m\mu$$

Expressed in words: in order to produce any reasonable filtering output, the number N of the holes should not be smaller than 20 in a field 13 in Fig. 7; in order not to make the filter too expensive, the number N should not be larger than 200,000. It should be considered in this connection that the tearing of a single hole renders the filter useless.

Further, the center distance between adjacent holes should not be larger than $15d$ because otherwise the output becomes too small; it should not be smaller than $2d$ in order not to unduly weaken the material bridges between adjacent holes.

Lastly, the diameter of the holes should not be larger than 300 m$\mu$ because beyond this size of holes other filters are already in existence which are much cheaper to manufacture. The diameter of the holes should not be smaller than 3 m$\mu$ for the following reasons: first, it does not seem possible, so far as we are aware at present, to produce an electron beam below this diameter; second, for holes smaller than 3 m$\mu$ the qualities of an ideal filter cease to exist, because foils thinner than 10 m$\mu$ cannot be made at present so far as we are aware.

The filters described above are of importance not only in the art of colloidal chemistry but also in medicine, that is, for example, for the separation of bacteria and virus of different size or of different ultra-visible blood particles, or for the isolation of any colloidal parts from cellular masses by means of fractional filtration.

A further particular advantage of the filter according to the invention is that the residue remaining on the filter after completion of the filtering operation can be examined directly in the optical microscope and in the electron microscope since the filter foil acts as object carrier. For this purpose, it is advisable to construct the supporting diaphragm 16 in such a manner that it fits not only into the perforating apparatus and filter apparatus but also into the object supports of the two microscopes.

We claim:

1. Device for perforating foils for producing mechanical filters, comprising an evacuated vessel having means for generating a beam of corpuscular rays, holding means for supporting the foil to be perforated so as to extend in transversal direction relative to the path of said beam, a diaphragm having a group of apertures and being disposed between said beam-generating means and said holding means for separating said beam into a plurality of rays, and lens means for concentrating said rays onto said foil for simultaneously producing in said foil a corresponding group of pores by the burning effect of said rays.

2. Device for perforating foils for producing mechanical filters, comprising an evacuated vessel having means for generating a beam of corpuscular rays, holding means for accommodating the foil to be perforated so as to extend in transversal direction relative to the path of said beam, said holding means including a perforated sieve-like carrier for supporting the foil, said carrier having its perforations in register with the places on said foil at which filter pores are to be burned by said beam, electron-optical lens means for concentrating said beam onto said foil to produce a burning effect at said places, and shifting means for varying the position of said beam and said carrier relative to each other to direct said beam sequentially onto different sections of the foil.

3. Device for perforating coils for producing mechanical filters, comprising an evacuated vessel having means for generating a beam of corpuscular rays, holding means for supporting the foil in the path of said beam, a diaphragm having a group of apertures and disposed between said beam-generating means and said holding means for separating said beam into a plurality of rays, and lens means for concentrating said rays onto said foil for simultaneously producing in said foil a corresponding group of pores by said beam, said holding means including a carrier for said foil removably disposed in said vessel and having a plurality of perforations, each of sufficient size to cover the area of a group of pores produced in said foil, and means for shifting said carrier transversely to the direction of said beam to burn a plurality of separate groups of pores into said foil to register with the perforations in said carrier.

4. Device for perforating foils for producing mechanical filters, comprising an evacuated vessel having means for generating a beam of corpuscular rays, holding means for accommodating the foil to be perforated so as to extend in transversal direction relative to the path of said beam, said holding means including a carrier for said foil removably disposed in said vessel, lens means for concentrating said beam onto said foil to produce a perforating burning effect at the points of incidence, and displacing means for varying the relative position of said foil and said beam in transversal direction relative to said beam to cause said beam to burn a plurality of filter pores into said foil, said displacing means being operable exteriorly of said vacuum vessel.

5. Device for producing mechanical filters by perforating a foil, comprising a vacuum vessel, irradiating means in said vessel for generating a beam of corpuscular rays, holding means removably arranged in said vessel for accommodating said foil so as to extend across the path of said beam, an electron-optical concentrating lens arranged between said irradiating means and said holding means for focusing said beam onto said foil so as to burn a hole through said foil, and displacing means for varying the relative position of said foil and said beam in transversal direction relative to said beam to cause said beam to burn a plurality of filter pores into said foil, said displacing means being operable exteriorly of said vacuum vessel.

6. The method of producing mechanical filters by perforating a foil, which comprises placing said foil into an electronic vacuum vessel, focusing in said vessel a beam of corpuscular rays onto said foil and burning a hole through said foil by means of said beam, displacing said foil and said beam relatively to each other to cause said beam to burn another hole through said foil, repeating the procedure to obtain a multitude of filter pores in said foil, and removing the filter foil thus produced from said vacuum vessel.

HELMUT RUSKA.
BODO v. BORRIES.